Figure 1:
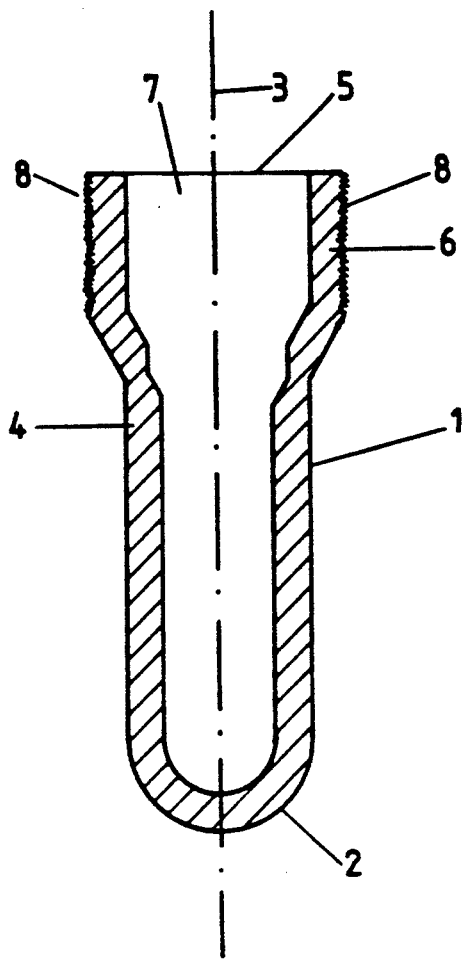

United States Patent [19]
Horwege

[11] Patent Number: 5,312,572
[45] Date of Patent: May 17, 1994

[54] PROCESS FOR HEATING A BLOW MOLDING PREFORM

[75] Inventor: Claus Horwege, Hamburg, Fed. Rep. of Germany

[73] Assignee: Krupp Corpoplast Maschinenbau GmbH, Hamburg, Fed. Rep. of Germany

[21] Appl. No.: 913,583

[22] Filed: Jul. 14, 1992

[30] Foreign Application Priority Data

Jul. 19, 1991 [DE] Fed. Rep. of Germany ........ 4123933

[51] Int. Cl.⁵ ................ B29C 35/08; B29C 49/64
[52] U.S. Cl. .................... 264/25; 264/521; 264/535
[58] Field of Search .......... 264/521, 535, 25; 425/174.4, 526

[56] References Cited

U.S. PATENT DOCUMENTS

| | | | |
|---|---|---|---|
| 3,689,346 | 9/1972 | Rowland | 425/174.4 |
| 3,865,912 | 2/1975 | Rosenkranz et al. | 264/521 |
| 4,076,071 | 2/1978 | Rosenkranz et al. | 264/521 |
| 4,079,104 | 3/1978 | Dickson et al. | 264/535 |
| 4,153,667 | 5/1979 | Brady et al. | |
| 4,606,723 | 8/1986 | Pasternicki | 425/174.4 |
| 4,997,692 | 3/1991 | Yoshino | 264/535 |
| 5,124,110 | 6/1992 | Yokobayashi | 264/521 |

FOREIGN PATENT DOCUMENTS

| | | |
|---|---|---|
| 1816489 | 8/1970 | Fed. Rep. of Germany ...... 264/521 |
| 3002189 | 7/1980 | Fed. Rep. of Germany . |
| 2042408 | 9/1980 | United Kingdom . |

OTHER PUBLICATIONS

Patent Abstract of Japan, vol. 7, No. 71 (M-202) (1216) Mar. 24, 1983 & JP-A-57-212031 (Asahi Kasei Kogyo K.K.) Dec. 27, 1982.

*Primary Examiner*—Catherine Timm
*Attorney, Agent, or Firm*—Harness, Dickey & Pierce

[57] ABSTRACT

A preform of a thermoplastic material, especially a material which is orientable during blow forming, has an opening region, a closed bottom as well as walls connecting the bottom with the opening region. In the region of at least a part of the surface demarcating the preform a texturing enlarging the surface is provided, which has a low profile depth relative to the wall thickness of the preform. A process for heating a preform of a thermoplastic material is also disclosed which includes texturing a portion of the surface of the preform to enlarge the surface area thereof whereby the time required to heat the preform to a desired temperature suitable for blow molding is reduced. The preform is also rotated as it is moved past a heating device and the heating device is controlled such that the heating device combination with the texturing provides a desired temperature profile rendering the preform suitable for blow molding.

12 Claims, 3 Drawing Sheets

PROCESS FOR HEATING A BLOW MOLDING PREFORM

The invention concerns a preform of a thermoplastic material, particularly a material that is orientable during the blow forming process, which includes a port region, a closed bottom as well as sidewalls connecting the bottom with the port region.

Furthermore, the invention concerns a process for the manufacture of a thermoplastic preform, which is temperable within the range of a heating apparatus, most particularly to a temperature suitable for blow forming and where the preform is generated in such a way that in the region of one end it is closed and in the region of the other end it is provided with a port.

Finally, the invention concerns a process for heating a preform of a thermoplastic material, particularly a preform suitable for blow molding, where the preform is subjected to at least one tempering source of heat.

Such preforms are used to make bottles or other containers in a blow process. For such a process, particularly preforms of polyethylene terephthalate (PTE) are suited. This material has the advantage, that it can be oriented during the forming of the container, and by virtue of this orientation can be given a considerable strength, which makes it possible to make the containers to be produced relatively thin-walled. Before exposing the preforms to a blow pressure it is necessary to raise them to a temperature that facilitates forming: It is especially necessary to raise the regions of the preform which are to be expanded during the blow process to a temperature, which makes orienting the material possible. But it is also possible to carry out the tempering of certain regions of the preform, especially a region facing the opening, in such a way that here the reshaping for making a thread or a back-up ring can be facilitated. In this forming process the material generally remains in an amorphous state.

Sources of radiation are frequently used for tempering the preform. Especially sources of infrared radiation are widely used. However, because a preform is frequently made from a transparent material, such a heating method takes considerable time due to the fact that a large portion of the impinging radiation passes through the material. Even if reflectors are arrayed behind the preforms the efficiency of the heating method is relatively low, because on the one hand the path of the radiation through the wall of the preform is relatively short and on the other hand considerable losses due to scattering as well as absorption by linings or other items occur.

This leads to the result that even for a required uniform tempering of the preform a considerable heating time is necessary. In the case of a required graduated temperature distribution in the region of the preform the additional problem occurs that due to the scattering tendency of the radiation source used, a targeted application of radiation energy is only possible to a limited degree, and that during a relatively lengthy heating process the generally desired temperature equalization processes between an outer region and an inner region occur, but that beyond this equalization processes in the longitudinal direction of the preform take place as well, which allow the generation of a temperature profile with large temperature differences in a small area occurring only to a limited extent.

It is therefore the object of the present invention to generate a preform of the kind mentioned in the introduction in such a manner that it can be provided within a short time with a programmable temperature distribution.

This objective is realized according to this invention in that in the region of at least a part of a surface demarcating the preform a texturing is provided which increases the surface, which texturing has a low profile depth as compared to the wall thickness of the preform.

A further objective of the present invention consists in improving the process for producing the preform in such a way that a preform is provided which can easily be given a thermal profile.

This objective is achieved in accordance with this invention by texturing the preform in such a way that at least in the region of a part of it the surface is enlarged.

Another objective of the present invention consists in improving the process of heating the preform in such a way that the preform can be tempered at a precise location and within a short period of time.

This objective is achieved according to the invention by providing the preform before heating, at least within one region of its surface, with a texturing enlarging its surface.

By providing a texturing within the region of the surface of the preform it is possible to improve the efficiency of the heating process. On the one hand, this results from the fact that, due to the enlarged surface as a result of texturing, the entry of the oblique portions of the radiation into the preform is made easier. Beyond this the amount of reflection is reduced by, for example, making the surface rough, and thus the proportion of the radiation components fed into the preform is further increased.

The irregularly oriented segments of the surface of the preform furthermore have the effect that considerable portions of the radiation do not penetrate the preform in a radial direction but show an inclined path relative to a radial orientation. This results in longer penetration paths through the material and thus higher rates of absorption. Textured surfaces have the further effect that portions of the radiation reflected from the surface regions of the preform back against the walls are subjected to differing phase shifts, which, at the appropriate wave lengths, result in a partial offset of incident and reflected wave portions, which could result in their being converted into heat. Thus a multiplicity of effects influencing the heating process positively occur, which, individually as well as collectively, increase the proportion of absorbed radiation energy and thus lead to a reduction of the heating time.

According to a preferred embodiment of the invention provision is made for a surface profile in at least one programmable region of the surface. By means of an alternating array of profiled and non-profiled regions it is possible to control the efficiency of the absorption of radiation and thus achieve a temperature profile, especially in the longitudinal direction of the preform. In this case it is anticipated that the preform is raised to a higher temperature in the region of its profiled surface and a lower temperature in the region of its unprofiled surface. In particular this makes it possible to realize sharply confined temperature transitions, because only short heating times are required for generating higher temperatures and equalization processes inhibiting the formation of the generated temperature profile can only take place during a comparatively short time span.

According to another preferred embodiment of the invention it is anticipated to provide certain regions with different profiles. This makes it possible to generate precisely predictable temperature profiles, because the efficiency of the particular radiation absorption can be pre-adjusted in a nearly continuous manner. Particularly in the case of a combination of sources of radiation, which can radiate in the direction of the profiling, at least within a certain region, with varying intensity, the desired temperature profile can be generated within a very short heating time and at a high efficiency.

According to a further preferred embodiment of the invention it is anticipated that profiling occurs in the region of the outer surface of the preform as well as within the region of an inner surface of the preform facing an interior space. In particular, by such a construction the reflective behavior as well as the tempering of the preform in the region of its interior demarcation can be affected.

Further details of the present invention follow from the subsequent extensive description and the included drawings, in which preferred embodiments of the invention, for example, are illustrated.

Figure 2:
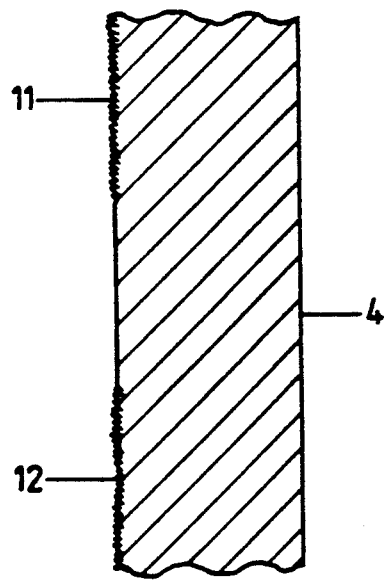
Figure 3:
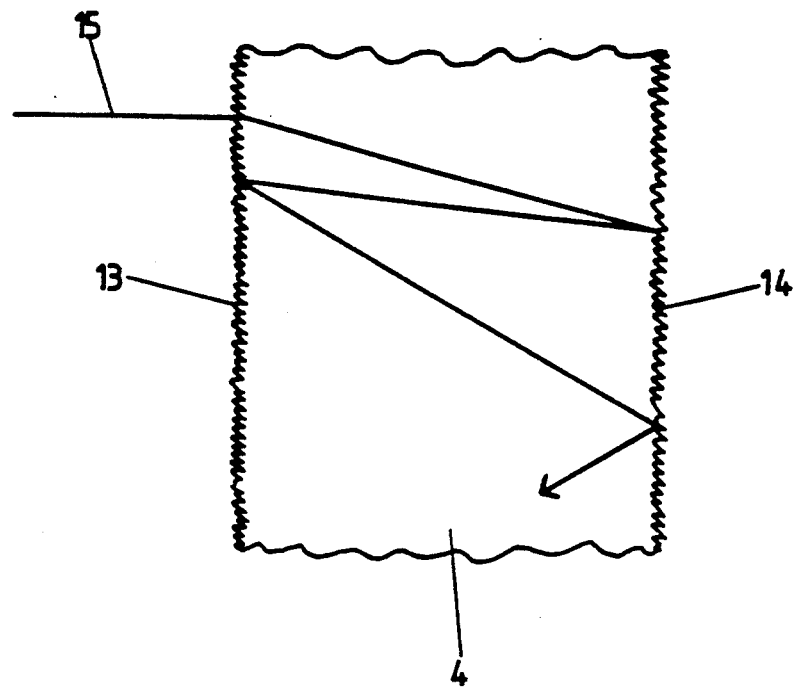
Figure 4:
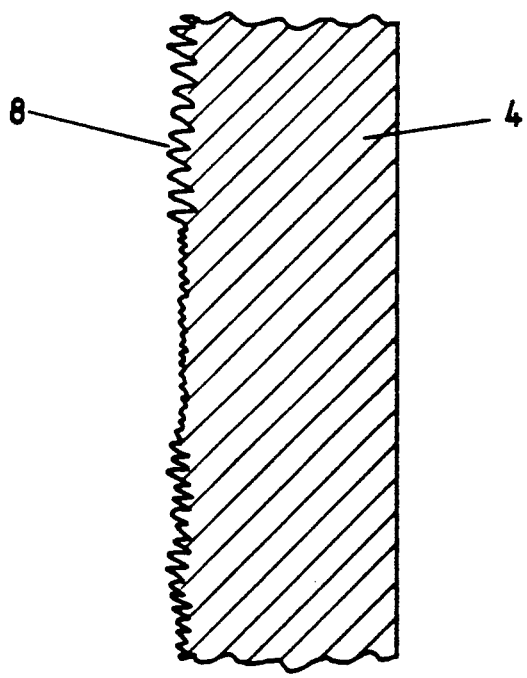
Figure 5:
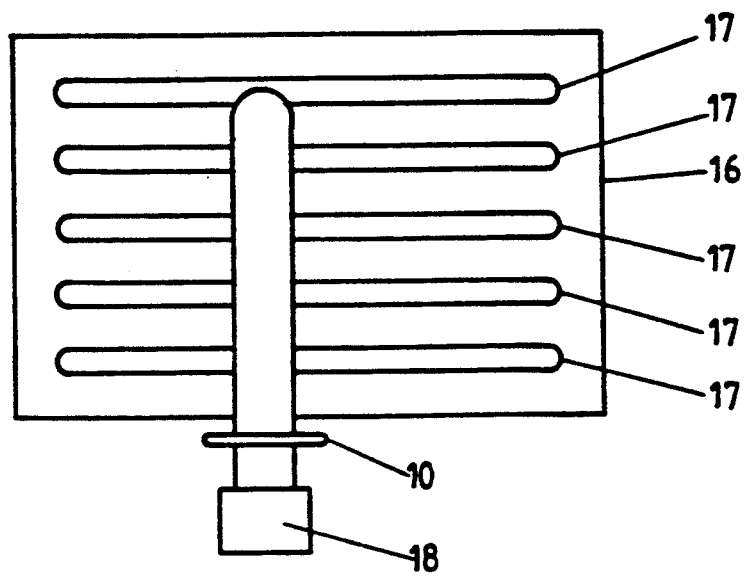
Figure 6:
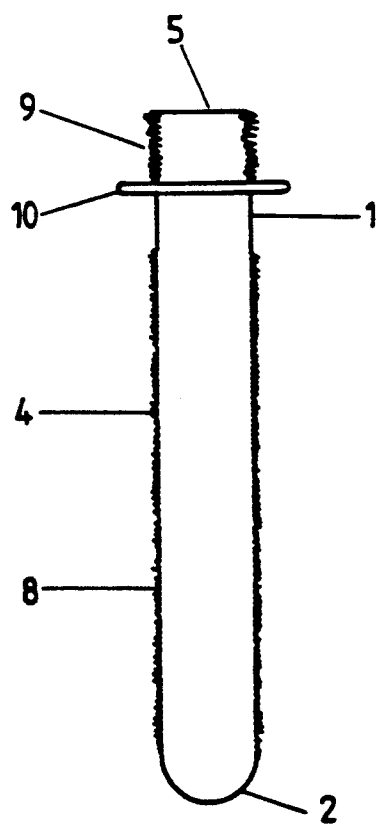

The drawings show:

FIG. 1: a longitudinal section through a preform which is provided with a textured surface in the region of a neck portion facing its opening and which neck portion is has provisions for the formation of a thread, FIG. 2: a partial view of a longitudinal section through a preform which is provided with profile regions separated from each other, FIG. 3: an enlarged schematic of a radiation path within the preform, FIG. 4: an enlarged partial view of a longitudinal section through a preform with differing profile depths, FIG. 5: a side view of a preform moving by a heating device and FIG. 6: a side view of a preform which is provided with a surface profile in the essential region of its extension between a support ring and the bottom region.

A preform (1) consists essentially of a bottom (2), a wall (4) extending essentially cylindrically along a longitudinal axis (3) a neck (6) providing a transition from the wall (4) to the port (5), as well as an interior space (7) bounded by the wall (4). In the embodiment according to FIG. 1 the preform (1) has a texturing (8) in the region of its exterior surface, which can be formed, for example, as a wrinkle finish of the surface. The texturing (8) leads to an enlargement of the surface of the preform (1) and facilitates a shorter heating time. The preform according to FIG. 1 is intended to be heated initially in the region of its neck (6) in order to form a thread (9) and a support ring (10). Such a treatment of the preform (1) is particularly useful when, in order to increase the thermal stability of the preform (1), the after preform (1) the reshaping still largely amorphous neck region is to be crystallized.

In the embodiment according to FIG. 2 texturing (8) is provided in a side region of wall (4) and is formed from textured segments (11, 12). By means of the alternating placement of textured segments (11,12) and essentially smooth segments of the surface it is possible to generate a temperature profile in the direction of the longitudinal axis (3). In the embodiment according to FIG. 3 texturing (8) is provided in the region of an outer surface (13) as well as in the region of an interior surface (14) facing an interior space (7). A schematically shown radiation path (15) illustrates a possible refractive and reflexive behavior, which results in comparatively long penetration paths of the radiation through wall (4) of preform (1) and thus results in a high degree of absorption. By superimposition of a multitude of such radiation paths (15) it is furthermore possible, that superimpositions of the radiation occur, which result in extinguishing radiation components, causing release of heat. Such a partial extinction can also occur by virtue of the fact that as a result of the surface texturing a phase shift occurs during the reflection, which promotes a corresponding superimposition of radiation components.

According to the illustration in FIG. 4 it is also possible to provide texturing (8) in the region of the surface of preform (1) with varying profile depths. By virtue of the varying profile depths it is possible to generate smooth transitions for the achievement of programmable temperature profiles and thus provide precisely defined temperature profiles.

For tempering the preform (1) is, in accordance with FIG. 1, moved past a heater (16). In the region of the heater (16) radiator sources (17) are disposed whose longitudinal axes extend essentially in the direction of transport of the preforms (1). In order to simplify the transport of the preform (1) it is conveyed by a holding device (18).

In FIG. 6 a preform is shown which was provided with an outer thread (9) and a sprayed on support ring (10). Toward the bottom (2), essentially in the region of the wall (4), and below the support ring (10) a wrinkle finish in the form of texturing (8) is provided. In this embodiment the texturing (8) is provided only in the region of an exterior demarcated portion of the preform (1). However, in order to improve heat absorption it is also possible to provide additional texturing (8) in the region of the demarcations of the preform (1) facing the interior (7). For particular applications it is also conceivable to provide surface enlarging texturing (8) in the region of the bottom (2).

The production of texturing (8) in the region of the preform (1) can be achieved in different ways. In the case of a relatively small number of preforms (1) to be provided with texturing (8), it is possible to first extrude the preform (1) or to form it by using a spray-molding device for the fabrication of plastic. Subsequently the outer surface (13) or the interior surface (14) of the preform (1) is treated mechanically. This process can, for example, be carried out by a sandblasting or a grinding process. In principle, it is also possible to achieve a surface roughness by suitable chemical treatment.

Besides the subsequent application of the texturing (8) it is also possible, for example, to provide a spray mold with a suitable texturing in the region of the surfaces confining the form cavity and to produce directly textured preforms (1). This process is particularly useful in the production of large quantities of preforms (1).

For a preform (1) which is provided with texturing (8) in a significant region of its wall (4), it is possible, in the case of texturing (8), which is adequately provided with smooth transitions, to form a container whose surface quality is comparable to that of a container which was formed from a preform (1) with a smooth surface structure. This results essentially from the considerable surface enlargement occurring during the blow and equalization processes, during which particularly changes in the realm of the molecular configuration occur, which result in an orientation of the material.

I claim:

1. Process for heating a preform of a thermoplastic material in preparation for subjecting said preform to a blow molding operation and said preform being suitable for blow molding, characterized in that the preform (1) is provided at least over a portion of its surface (13, 14) with a texturing enlarging the surface (13, 14) prior to the thermal treatment, heating said preform to a suitable temperature for blow molding, said heating being operative to provide a programmable temperature profile in the region of the preform (1) by means of the texturing (8), the profile depths of the texturing matching the temperature profile to be generated, and thereafter subjecting said preform to the blow molding operation.

2. Process according to claim 1, characterized in that the preform (1) is given a rotary motion relative to its longitudinal axis (3) for at least a portion of the time span required for heating it.

3. Process according to claim 2, characterized in that the preform (1) is moved past a heating device (16) while it is being heated.

4. Process according to claim 2, further comprising a heating device and characterized in that the preform (1) is acted upon by at least two vertically disposed radiation devices (17), one above the other, in the region of the heating device (16).

5. Process according to claim 4, characterized in that the radiation device (17) is provided with different controls for facilitating the generation of a temperature profile in the region of the preform (1).

6. Process according to claim 1, characterized in that the preform (1) is moved past a heating device (16) while it is being heated.

7. Process according to claim 1, further comprising a heating device and characterized in that the preform (1) is acted upon by at least two vertically disposed radiation devices (17), one above the other, in the region of the heating device (16).

8. Process according to claim 3, characterized in that the preform (1) is acted upon by at least two vertically disposed radiation devices (17), one above the other, in the region of the heating device (16).

9. Process according to claim 6, characterized in that the preform (1) is acted upon by at least two vertically disposed radiation devices (17), one above the other, in the region of the heating device (16).

10. Process according to claim 7, characterizd in that the radiation device (17) is provided with different controls for facilitating the generation of a temperature profile in the region of the preform (1).

11. Process according to claim 8, characterized in that the radiation device (17) is provided with different controls for facilitating the generation of a temperature profile in the region of the preform (1).

12. Process according to claim 9, characterized in that the radiation device (17) is provided with different controls for facilitating the generation of a temperature profile in the region of the preform (1).

* * * * *